United States Patent [19]

Dunleavy et al.

[11] 4,107,106

[45] Aug. 15, 1978

[54] PHENOL-ALDEHYDE-AMINE RESIN/GLYCOL CURATIVES FOR ENERGY ABSORBING POLYURETHANES

[75] Inventors: Raymond Augustine Dunleavy, Charleston; Anthony Joseph Papa, St. Albans, both of W. Va.

[73] Assignee: Union Carbide Corporation, New York, N.Y.

[21] Appl. No.: 743,613

[22] Filed: Nov. 22, 1976

[51] Int. Cl.$^2$ .............................................. C08J 9/00
[52] U.S. Cl. .................................... 521/164; 521/167
[58] Field of Search ................ 260/2.5 AM, 2.5 AQ, 260/51.5, 58

[56] References Cited

U.S. PATENT DOCUMENTS

| | | | |
|---|---|---|---|
| 3,186,969 | 6/1965 | Cox et al. | 260/51.5 |
| 3,245,924 | 4/1966 | Cox et al. | 260/51.5 |
| 3,493,257 | 2/1970 | Fitzgerald et al. | 293/71 |
| 3,514,144 | 5/1970 | Alderfer | 293/71 |
| 3,558,529 | 1/1971 | Whitman et al. | 260/2.5 AS |
| 3,580,869 | 5/1971 | Rhodes et al. | 260/2.5 AM |
| 3,586,649 | 6/1971 | Cobbledick | 260/2.5 AZ |
| 3,591,561 | 7/1971 | Kazama et al. | 260/2.5 AM |
| 3,823,176 | 7/1974 | Levis et al. | 260/2.5 AQ |
| 3,939,106 | 2/1976 | Dunleavy et al. | 260/2.5 AM |

OTHER PUBLICATIONS

Hintzen et al. – Paper Given at SAE Meeting, Detroit, Mich., Jan. 1973, pp. 1–16.
Dunleavy – J. Elastoplastics, 2, 56–67 (1970).
Kuryla et al. – J. Cellular Plastics, 2–14 (Mar. 1966).
Desai – Paper Given at SPI Meeting, Montreal, Canada, Sep. 1972, pp. 386–402.

Primary Examiner—Lewis T. Jacobs
Attorney, Agent, or Firm—Dale Lynn Carlson

[57] ABSTRACT

This invention relates to the use of phenol-aldehyde-amine resin/diol curatives in the production of cellular polyurethane elastomers having outstanding energy absorbing properties. The elastomers are useful as energy managing components in automobiles and the like.

9 Claims, No Drawings

PHENOL-ALDEHYDE-AMINE RESIN/GLYCOL CURATIVES FOR ENERGY ABSORBING POLYURETHANES

BACKGROUND OF THE INVENTION

1. Field of the Invention

Until fairly recently, the technology pertaining to rubber-like materials (elastomers) as force-reducing impact media has not been well quantified because of the scarcity of actual use requirements and lack of suitable test equipment. However, automotive industry trends toward safety impact bumpers brought about by legislation have significantly increased research activities to acquire such technology. Such research activities should take into account the following theoretical considerations. Yielding materials on impact reduce impact forces by decelerating the impacting object through a distance. The maximum force generated is the product of the mass of the impacting object and its maximum deceleration. Thus, if an object decelerates through a short distance, forces are higher than if an object decelerates less rapidly through a longer distance. The advantage of using rubber-like materials as impact media is that the original shape is recoverable after the impact cycle.

Rubber-like materials must meet several criteria to serve effectively a force-reducing impact media (bumpers) for automobiles. The materials must provide sufficient resistance to the impacting object to stop the object in a reasonable distance so that acceptable forces on the automobile are obtained. Then the media must return to substantially its original dimensions. These criteria must hold over the service temperature and impact speed of the operation. Further, rubbers are viscoelastic in nature (i.e., their physical properties vary as a function of temperature and strain rate). Therefore, in the evaluation of rubber-like materials as energy managing impact components (bumpers) for automobiles, these factors must also be taken into account. Additionally, the evaluation should simulate closely actual use conditions. Prior art bumpers employing rubber-like materials as energy managing media have not been entirely satisfactory.

2. Description of the Prior Art

By way of illustration, U.S. Pat. No. 3,493,257 described a composite urethane-steel bumper stated to be capable of withstanding the impact of a 4000 pound automobile traveling at five miles per hour with a stationary object without damage to the bumper. A urethane thickness of 1.5 inches and the formulation used to produce the urethane are disclosed in the patent. Based on an analysis of that disclosure, there are shortcomings both in the urethane formulation and in the bumper design described in the patent. The approximate force generated from the given impact conditions can be calculated from the equation:

$$F = \frac{V^2 \times W \times 0.186 \times E_f}{X \times E} \qquad (A)$$

where
$X$ = stroke distance, inches
$F$ = force, lbs.
$V$ = velocity, ft/sec.
$W$ = weight, lbs.
$E_f$ = fraction of total energy absorbed
$E$ = Cycle efficiency fraction relative to the square wave associated with 100 percent efficiency.

Assuming the stroke is ⅔ the thickness (1.0 inch), $E_f$ is 0.3 and E is 0.5, then the force (F) calculated from equation (A) is 32,800 pounds at impact. This force is well above the force expected to be capable of deforming the steel reinforcing bar of the composite automotive bumper described in the patent.

Further, the following formulation (reaction mixture) is described in U.S. Pat. No. 3,493,257:

| Ingredient | Parts Per Hundred (by weight) |
|---|---|
| Organic Polyisocyanate | 35.8 |
| Polyol | 100 |
| Aromatic Diamine | 26.4 |
| H₂O | 0.05 |

This formulation contains a 1000 molecular weight polyoxypropylene polyol and a relatively large amount of the aromatic diamine is employed. The moduli of such urethanes produced from such formulations are relatively sensitive with respect to temperature changes. The urethane becomes hard at cold temperatures thereby decreasing the amount of deflection from impact as the temperature is reduced. This effect increases object deceleration which results in increased forces on the automobile. Thus, from both urethane formulation and design considerations, the bumper of U.S. Pat. No. 3,493,257 is not suitable to meet the applicable Federal Motor Vehicle Safety Standard (i.e., FMVSS 215) requirements for a safety bumper.

As a further illustration, U.S. Pat. No. 3,514,144 describes a realistic concept for an energy absorbing urethane elastomer bumper. The statement is made "with a bumper of modest dimensions, the energy of impact for a heavy automobile traveling at 5 mph can be fully dissipated by this construction". However, no test data is given nor any description of the urethane elastomer presented. A temperature insensitive and energy absorbing elastomeric material would be required to make the urethane bumper of the latter patent functional.

Additionally, U.S. Pat. No. 3,558,529 discloses the use of a mixture of incompatible polyols for making temperature-insensitive urethane polymers that are useful as crash padding, insulation, etc. However, the products of the latter patent are not entirely satisfactory energy absorbing materials. Thus, the specific disclosures of this patent (particularly the Examples) relate only to polyols which impart to the products insufficient load-bearing properties for many energy absorbing applications, especially for automobile bumpers.

Further, U.S. Pat. No. 3,580,869 discloses that urethane automobile bumpers can be produced from reaction mixtures containing a polyol, an aromatic polyamine having unhindered primary amino groups, an organic polyisocyanate, and an aromatic glycol. Such reaction mixtures are relatively difficult to process unless the aromatic amine and the organic polyisocyanate are prereacted to form a prepolymer. Moreover, urethane bumpers so produced have relatively poor load-bearing properties, and it is believed they have been found suitable for use only as "cosmetic" bumpers (as distinguished from energy absorbing bumpers). Improved load bearing and better processability are achieved using the polymer polyol-hindered aromatic amine-organic polyisocyanate formulations of U.S. Pat.

No. 3,586,649 to produce the urethane. However, such urethanes lack the desired degree of strain rate sensitivity.

While particularly unique energy managing elastomers can be prepared employing certain aromatic polyamines/aromatic glycols as curatives (not those of the present invention) as described in the U.S. Pat. No. 3,939,106, there is still room for further improvement in the production of energy managing elastomers. For example, it is desirable to provide a curative that will increase the strain rate sensitivity of the elastomers in some formulations.

SUMMARY OF THE INVENTION

In accordance with this invention, a process for producing a cellular polyurethane elastomer is provided which comprises forming and curing a reaction mixture containing:
(a) a polyol,
(b) as a curative, the reaction product of:
 (I) a phenol which has at least one unsubstituted reactive position on the aromatic nucleus,
 (II) an aldehyde, and
 (III) an aromatic amine,
(c) as a curative, an organic diol,
(d) an organic polyisocyanate in an amount that provides from 0.8 to 1.3 isocyanato groups per active-hydrogen group in the reaction mixture,
(e) a catalytic amount of catalyst for the curing of the reaction mixture, and
(f) a blowing agent in an amount sufficient to produce a cellular structure in the elastomer,
said reaction mixture containing from 99 to 30 parts by weight of (a) and from 1 to 70 parts by weight of (b) per 100 parts by weight of (a) and (b) and said reaction mixture containing from 1 to 35 parts by weight of (c) per 100 parts by weight of (a) and (c) with the proviso that the reaction mixture contains no more than 35 parts by weight of (b) and (c) per 100 parts by weight of (a), (b), and (c). The preferred reaction mixture composition contains from 99 to 70 parts by weight of (a) and from 1 to 30 parts by weight of (b) per 100 parts by weight of (a) and (b) and said reaction mixture containing from 1 to 30 parts by weight of (c) per 100 parts by weight of (a) and (c) with the proviso that the reaction mixture contains no more than 30 parts by weight of (b) and (c) per 100 parts by weight of (a), (b) and (c).

As will be apparent to those skilled in the art, a specific formulation (reaction mixture) for an energy absorbing impact elastomer cannot be decribed which would answer each and every application requirement. The reaction mixture used for a specific application will depend upon the specifications necessary for satisfactory performance under the given conditions. For example, the particular operating temperature range, the final forces and deflections allowed during impact cycle, cost requirements, processing requirements, etc. must be considered for each case.

DESCRIPTION OF THE PREFERRED EMBODIMENTS

The polyol employed in the process of this invention can be a hydroxyl-terminated polyester, a polyhydroxyalkane, a polyphenol, a polyoxyalkylene polyol, or the like. Among the polyols which can be employed are one or nore polyols from the following classes of compositions, alone or in admixture, known to those skilled in the polyurethane art.

(a) Alkylene oxide adducts of polyhydroxyalkanes;
(b) Hydroxyl-terminated polyesters;
(c) Alkylene oxide adducts of non-reducing sugars and sugar derivatives;
(d) Alkylene oxide adducts of phosphorus and polyphosphorus acids;
(e) Alkylene oxide adducts of polyphenols;
(f) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxbutane, 1,4-, 1,5- and 1,6-dihydroxhexane, 1,2-, 1,3-, 1,4-, 1,6-, 1,8-dihydroxyoctane, 1,10-dihydroxydecane, glycerol, 1,2,4-trihydroxybutane, 1,2,6-trihydroxyhexane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes. Ethylene oxide capped ($-OC_2H_4OH$ terminated) propylene oxide polyols are preferred because of their increased reactivity over non-capped propylene oxide polyols thus leading to decreased demold times for the molded article. Illustrative hydroxyl-terminated polyesters are those which are prepared by polymerizing a lactone in the presence of an active hydrogen-containing starter as disclosed in U.S. Pat. No. 2,914,556.

A preferred embodiment of polyols employed in this invention is a polymer polyol, having a liquid polyol component that has a molecular weight of at least 1500 (preferably from 2,000 to 8,400) and that has a hydroxyl number from 20 to 120 (preferably from 25 to 50 when microcellular elastomers are being produced). The polymer polyol also has a polymer component that has a molecular weight of at least 5000. The polymer component is dissolved or dispersed in the polyol component. The polymer polyol preferably contains from 85 to 60 parts by weight of the polyol and from 15 to 40 parts by weight of the polymer per 100 parts by weight of the polymer polyol. In the process of this invention, these polymer polyols react with the organic polyisocyanate to produce urethane groups. Polyols of the polymer polyol type are used in the formulations of this invention because they impart higher modulus to the elastomer than conventional polyols.

Further, the polymer polyols are desired because of the modulus insensitivity to temperature of the elastomer produced therefrom. Suitable polymer polyols are disclosed in U.S. Pat. Nos. 3,304,273; 3,383,351 and 3,523,093, Belgian Pat. No. 788,115, Canadian Pat. No. 785,835 and in Reference 3 (identified below).

The polymers in the polymer polyols employed in one embodiment of the process of this invention include those produced from monomers such as hydrocarbon olefins (e.g., styrene, chlorostyrene) olefinic nitriles (e.g. acrylonitrile), alkenyl esters of alkanoic acids (e.g., vinyl acetate vinyl propionate, vinyl butyrate), alkyl acrylates (e.g., methyl acrylate and ethyl acrylate), alkyl methacrylates (e.g., methylmethacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the polyol.

The polyols in the polymer polyols employed in one embodiment of the process of this invention include any of the afore-mentioned polyols, preferably alkylene oxide adducts of polyhydroxyalkanes.

A reaction product of a phenol, an aromatic amine, and an aldehyde is employed in the process of this invention. Any suitable sequence of steps in the reaction may be employed. The following reaction sequence is illustrative:

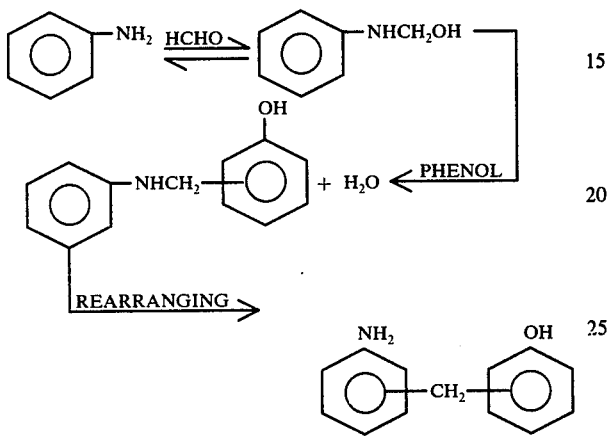

In this sequence, the initial reaction of the aldehyde with the aromatic amine produces an N(1-hydroxyalkyl) aromatic amine, which in turn condenses with the phenol. This product then rearranges to form an aminoarylhydroxyarylalkane.

The amino group is thus free to react with additional formaldehyde, and the sequence of reactions is continued. By proper adjustment of the reaction conditions, the molecular structure of the condensation products can be controlled within readily reproducible limits, which permits a high degree of batch-to-batch uniformity. Whereas in the preferred embodiment of the present invention the above-described condensation reaction is conducted in the absence of a catalyst, it is within the scope of the invention to perform said condensation reaction in the presence of an acidic or a basic catalyst if desired.

Without limiting the invention to any particular process, the phenol-formaldehyde-aniline resin is prepared by any of several methods. For example, in addition to the above condensation reaction, the resin may be prepared by (a) the reaction of aniline with methylol phenols, or (b) the reaction of aniline with phenolic resole resins.

The phenols which can be employed to produce the condensation products are the phenols which have at least one unsubstituted reactive position on the aromatic nucleus. It is normally the case that the reactive positions on the aromatic nucleus are those which are ortho or para, and preferably ortho, to the hydroxyl group. Therefore, phenols which have at least one unsubstituted position ortho or para to the hydroxyl group can be used, but if only one unsubstituted reactive position is present, it is preferred that said reactive position be ortho to the phenolic hydroxyl group. The phenols which can be employed include, among others, phenol, the alkylphenols, the halophenols, the alkoxyphenols, the aminophenols, the dialkylaminophenols, the dihydroxybenzenes, the naphthols, and the like, which have at least one unsubstituted reactive position on the aromatic nucleus. Specific examples of phenols which can be employed include, among others, phenol, o-, m-, and p-cresol, o-, m-, and o-ethylphenol, o-, m-, and p-propylphenol, para-t-butylphenol and other butylphenols, the pentylphenols, the hexylphenols, the heptylphenols, the octylphenols, the nonylphenols, the decylphenols, the dodecylphenols, pentadecylphenols, the octadecylphenols, the dimethylphenols, the diethylphenols, the dipropylphenols, the dibutylphenols, cresylic acids and other mixtures of alkylphenols, para-aminophenol, chlorophenols, certain dichlorophenols, the bromophenols, o-, m-, and p-methoxyphenol, o-, m-, and o-ethoxyphenol, o-, m-, and p-butoxyphenol, o-, m-, and p-N,N-dimethylaminophenol, resorcinol, catechol, phloroglucinol and other trihydroxy benzenes, naphthols, dihydroxynaphthalenes, 2,2-bis (parahydroxyphenyl) propane, bis(para-hydroxyphenyl) sulfone, and other bisphenols, aminophenols, trihydroxbiphenyl and other hydroxybiphenyls, and the like. The preferred phenols are those which can be represented by the formula

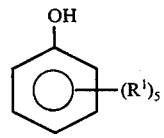

wherein each $R^1$ individually represents hydrogen, alkyl, preferably having not more than 18 carbon atoms, and more preferably not more than 10 carbon atoms, hydroxyl, amino, chloro, alkylamino or dialkylamino wherein preferably the alkyl groups thereof have not more than 18 carbon atoms and more preferably not more than 10 carbon atoms, provided that at least one $R^1$ is a hydrogen that is bonded to a reactive position on the aromatic nucleus. The most preferred phenols are phenol, the alkylphenols, meta and para aminophenols, and the monochlorophenols.

The aldehyes which can be employed include, among others, formaldehyde, acetaldehyde, propionaldehyde, chloral, and the like. Formaldehyde is preferred. The aldehyde can be employed in water solution or in an organic solvent. It is preferred to employ the formaldehyde in solution in methanol or as the 37 weight percent aqueous solution known as formalin.

The aromatic amines which can be employed are those which are represented by the formula ArNHR wherein Ar is an aryl group which has at least one unsubstituted reactive position on the aromatic nucleus, and wherein R represents a hydrogen or an alkyl. Ordinarily, the reactive positions are those which are ortho and para to the amino group. Accordingly, aromatic amines which have at least one unsubstituted position ortho or para to the amino group are highly desirable for use in preparing the condensation products employed in the invention. Among the aromatic amines which can be employed are aniline, the aminophenols, benzenediamines, alkyl-substituted anilines, alkyl-substituted benzenediamines, N-alkyl-substituted anilines, the naphthylamines, N-alkylaminoanilines, the haloanilines, and the like. Specific examples of aromatic amines which can be employed include, among others, aniline; m-, and p- benzenediamine; o-, m-, and p-toluidine; o-, m-, and p-ethylaniline; o-, m-, and p-butylaniline; 2,3- xylidine and other xylidines, 2,4- and 2,6-diaminotoluene and certain other diaminotoluenes; 1-ethyl-2,4-diaminobenzene; 1-propyl-2,4-diaminobenzene; 1-butyl-2,4-diaminobenzene; o- and p-diethylaminoaniline; o- and p-dimethylaminoaniline; alphanaphthylamine and other mono- and polyaminonaphthalenes; para-aminophenol and other aminophenols; o-chloroaniline and other chloroanilines and bromoanilines; aromatic amine/formaldehyde condensation products such as diaminodiphenylmethanes, triaminotriphenylmethanes, and the like; bis(aminophenyl) sulfones such as bis(4-aminophenyl) sulfone, and the like; N-alkylanilines such as N-methylaniline, N-ethylaniline and higher N-alkylanilines, N-methyltoluidines, and all of the aromatic amines enumerated above having N-alkyl substituents, but containing at least 1 amino hydrogen, and the like. The preferred aromatic amines are those which can be represented by the formula

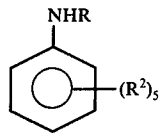

wherein R represents hydrogen or alkyl, preferably of not more than 4 carbon atoms, and wherein each $R^2$ individually represents a hydrogen, amino, alkylamino or dialkylamino wherein the alkyl groups thereof preferably have not more than 18 carbon atoms and more preferably not more than 10 carbon atoms, or hydroxyl, provided that at least one $R^2$ represents a hydrogen that is bonded to a reactive position on the aromatic nucleus. The more preferred amine is aniline.

The portion of the reactants employed to prepare the condensation products can be varied over a wide range. For example, for phenol and aniline themselves, the phenol-aniline molar ratio can be varied from about 15:1, and higher, to about 1:15, and lower. A desirable molar ratio of phenol-aniline is between about 9:1 and 1:9. The preferred molar ratio of phenol-aniline is in the range of from about 6:1 to about 1:6, and most preferably, from about 3:1 to about 1:3. When substituted and polyfunctional phenols and aniline are employed the ratio of (phenol+aniline): aldehyde can be varied from about 20:1, and higher to about 1:1, and lower. The preferred molar ratio of (phenol+aniline): aldehyde is from about 6:1 to about 1.2:1, and most preferably, from about 4:1 to about 1.4:1. Again, when substituted and polyfunctional phenols and aniline are employed, the ratio may vary somewhat from those indicated.

The preferred condensation products are those which are permanently fusible. The preparation of the permanently fusible reaction products is dependent chiefly upon the amount of aldehyde employed. As a guide, it has been found that when the molar ratio of (phenol+aniline): aldehyde is smaller than about 1.2:1, it becomes increasingly difficult to avoid residual reactivity which promotes crosslinking of the reaction products. Although the reaction products which are crosslinked, i.e., not permanently fusible, can be employed in the invention, the processing advantages attendant with the use of a permanently fusible condensation product are apparent, and for that reason, the permanently fusible reaction products are preferred.

The preferred method of carrying out the condensation reaction is to add the aldehyde slowly to an agitated mixture of phenol and aromatic amine, said mixture being maintained at a temperature of from about 0° C., to about 180° C during the addition. After the addition of aldehyde which can take from about 30 minutes to about 20 hours or longer, the reaction mixture is maintained at or above the temperature at which the aldehyde was charged for up to 2 hours. At the end of the reaction period, the reaction product can then be recovered by stripping off water, unreacted reagents, and any solvents that may be present, by heating to about 160°–200° C. and thereafter reducing the pressure.

Conventional equipment can be employed for the condensation reaction. For example, a reaction kettle equipped with agitator, means for reflux and distillation, nitrogen inlet means, and conventional heat transfer means, is suitable. The material of construction can be steel, stainless steel, glass, monel, and the like.

The diols useful as curatives in the present invention are organic diols, preferably having a low molecular weight. These diols may be either aromatic diols or alkylene glycols. The diols of the invention, in combination with the other curatives employed in the process of the invention, affect the strain rate sensitivity of the resulting urethane foam. That is, the apparent hardness is greater at higher strain rates, thereby providing greater energy absorption at impact. They are used to improve modulus or energy absorbing ability without impairing the temperature sensitivity of the urethane foam.

The preferred aromatic diol is the reaction product of ethylene oxide and aniline. The preferred alkylene glycols useful in the present invention include low molecular weight alkylene glycols such as ethylene and propylene glycol. They provide advantages because they are of relatively low viscosity when compared to aromatic glycols.

In a preferred embodiment of the invention, the curatives of the invention may be premixed prior to incorporation into the urethane formulation. For example, (a), the phenolaldehyde-aromatic amine, may be pre-mixed with (b), the organic diol, before incorporation into the urethane formulation. Such a mixture may contain from about 20 to about 80 parts by weight of (a) per 100 parts by weight of (a) and (b). The phenol-aldehyde-aromatic amine resins are soluble in alkylene glycols and in the reaction product of ethylene oxide and aniline. This was unexpected in view of the highly polar nature of the glycols and ethylene oxide/aniline in contrast to the non-polar nature of the resin.

The organic polyisocyanates employed in the process of this invention include monomeric and polymeric organic polyisocyanates, aliphatic and aromatic polyisocyanates and prepolymers produced by reacting a polyol with an excess of polyisocyanate. The preferred polyisocyanates are quasiprepolymers (especially the reaction products of excess tolylene diisocyanate and short chain polyoxypropylene diols or triols) because of the cost of processing such materials.

Suitable polyisocyanates for use in the process of this invention include poly(arylene-isocyanates) having at least two aromatic rings with one isocyanato group on each ring. These aromatic rings are suitably interconnected by an ether, sulfone, sulfoxide, methylene, propylene, carbonyl linkage or by two methylene groups connected to a benzene ring substituted by an isocyanato group. The aromatic rings of the poly(aryleneisocyanate) can be substituted e.g., by methyl, ethyl or propyl groups. Suitable poly(aryleneisocyanates) include polymethylene poly(phenyleneisocyanates) having the formula:

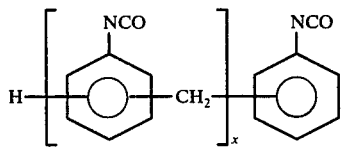

wherein $x$ has an average value from 1.1 to 5 inclusive (preferably from 2.0 to 3.0). Other suitable polyisocyanates include 4,4'-diphenylmethylene diisocyanate; 3,3'-diphenylmethylene diisocyanate; diphenyl diisocyanate; diphenylsulfone diisocyanate; diphenylsulfide diisocyanate; diphenylsulfoxide diisocyanate; and diphenylpropane diisocyanate; and the isomeric tolylene and xylene diisocyanates and their residue products.

The catalysts employed in the process of this invention accelerates the cure of the reaction mixture and include organic amines and organometallic compounds such as lead octoate, dibutyltin dilaurate, tin octoate, cobalt octoate and triethylene diamine.

The blowing agents employed in the process of this invention include any compound capable of generating an inert gas under the conditions used to cure the elastomer (e.g., by reaction to produce a gas or by volatilization). Suitable blowing agents include water and volatile halocarbons (expecially chlorocarbons and chlorofluorocarbons) such as methylene chloride, trichloromonofluoromethane, dichlorodifluoromethane, dichloromonofluoromethane, dichloromethane, trichloromethane, bromotrifluoromethane, chlorodifluoroethane, chloromethane, 1,1-dichloro-1,1-difluoromethane, 1,1-difluoro 1,2-2-trichloroethane, chloropentafluoroethane, 1-chloro-1-fluoroethane, 1-chloro-2-fluoroethane, 1,1,2-trifluoroethane, 2-chloro-1,1,2,3,3,4,4-heptafluorobutane, hexafluorocyclobutane and octafluorobutane. Other useful blowing agents include low-boiling hydrocarbons such as butane, pentane, hexane, cyclohexane and the like. The amount of the blowing agent employed is determined by the desired elements of the cellular elastomer to be produced. In this connection, the elastomers produced by the process of this invention can be designed to have densities, from 3 to 70 pounds per cubic foot. For certain applications e.g., for automobile bumpers, the elastomers preferably have densities from 3 to 40 to such densities can be achieved by employing from 3 to 20 parts by weight of a blowing agent (such as methylene dichloride or trichloromonofluoromethane) per 100 parts by weight of the active hydrogen-containing components and the polyisocyanate in the reaction mixture. In addition, a water blowing agent may be employed in amounts of 0.5 to 4 parts by weight of water per 100 parts by weight of polyol and isocyanate.

It is also within the scope of the invention to employ small amounts, e.g., about 0.001% to 5.0% by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of emulsifiers are the "nonhydrolyzable" polysiloxane-polyoxyalkylene block copolymers such as the block copolymers described in U.S. Pat. No. 3,505,377; U.K. patent specification No. 1,341,028 and British patent specification No. 1,220,471. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to silicon bonds. These various polysiloxane-polyoxyalkylene block copolymers preferably contain from 5 to 50 weight percent of polysiloxane polymer with the remainder being polyoxyalkylene polymer.

In the process of this invention, the reaction mixture can be formed and cured in accordance with the standard techniques known in the art. Thus in the cases where molded microcellular elastomers are to be produced, the techniques described in Reference 2 (identified below) are applicable. A suitable process sequence is as follows:

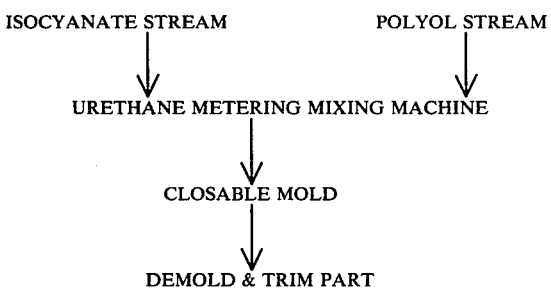

Since the polyurethane-forming and polyurea-forming reactions involved in the cure of the reaction mixtures are exothermic, curing can usually be accomplished without the application of heat from an external source.

In the practice of the process of this invention, one or more of each of the starting materials can be employed. In fact, it is often preferable to employ more than one of at least some of the starting materials, particularly the organic polyisocyanate (i.e., mixtures of isomeric tolylene diisocyanates) and catalyst (i.e., both tin and amine catalysts).

The cellular elastomers produced in accordance with this invention are useful as energy absorbing components in automobile bumpers, crash pads, packaging and the like.

The molecular weights of the polyols and polymer polyols described herein are number average molecular weights.

EXPERIMENTAL

The following experimental description illustrates the present invention. In the experimental description, the following abbreviations are used.

| Abbreviation | Meaning |
| --- | --- |
| Reference 1 | Hintzen, H. and Dunleavy, R.A., "An Energy Absorbing Elastomeric Bumper", Paper presented at the SAE Meeting, Detroit, Michigan, January, 1973. This reference describes the same experimental work as appears below with respect to "Compound A". |
| Reference 2 | Dunleavy, R.A., "Some Aspects of the Microcellular Urethane Material and Process", J. Elastoplastics, 2, January, 1970. |
| Reference 3 | Kuryla, W.C., et al., "Polymer/Polyols, a New Class of Polyurethane Intermediates", J. Cellular Plastics, March, 1966. |
| lb. | pound |

-continued

| Abbreviation | Meaning |
|---|---|
| max | maximum |
| min | minute |
| ft. | foot |
| pli | pounds per linear inch |
| pcf | pounds per cubic foot |
| pph | parts by weight per 100 parts by weight |
| % | percent |
| mph | miles per hour |
| cstks | centistokes |
| mm | millimeter |
| psig | pounds per square inch gauge |
| Resin | Blend of the active hydrogen-containing components and catalyst used to produce a polyurethane elastomer. |
| Activator | Blend of the isocyanate component and blowing agent used to produce a polyurethane elastomer. |
| R/A | Weight Ratio of Resin to Activator |
| EW (Equivalent Weight) | A unit base for calculation of reactant weight ratios. It is the weight of a substance that theoretically combines with one gram of hydrogen or eight grams of oxygen, i.e., EW (Hydrogen) = 1 and EW (Oxygen) = 8. |
| Hydroxyl Number (OH No.) | A measure of the equivalent weight of a hydroxyl-containing substance. $$\text{OH No.} = \frac{56.1 \times 1000}{EW}$$ Expressed as milligrams of potassium hydroxide per gram of material. |
| FNCO (Free Isocyanate) | A measure of the EW of an isocyanate-containing material. $$\% \text{ FNCO} = \frac{4.2}{EW} \times 1000$$ Expressed as the weight percent of the reactive or free isocyanate content of a substance. |
| Polyol A | A polyalkylene oxide triol produced from proylene and ethylene oxides and glycerine and having a molecular weight of about 4,900. The alkylene oxide units are present primarily in blocks and the primary OH content is about 75%. The ethylene oxide is used to "cap" the triol. Based on its alkylene oxide content this triol contains 85 wt.-% $C_3H_6O$ and 15 wt.-% $C_2H_4O$. |
| Polymer/Polyol I | A polymer/polyol with an OH No. of about 28 which is produced by polymerizing 20 weight percent acrylonitile in 80 weight percent Polyol A. The polymer in the polymer/polyol has a molecular weight of over 5000. |
| Polyol B | A polyalkylene oxide diol produced from propylene and ethylene oxides and propylene glycol and having a molecular weight of about 2800. The alkylene oxide groups are present primarily in blocks and the primary OH content is about 75% The ethylene oxide is used to "cap" the diol. Based on its akylene oxide content, this diol contains 85 wt-% $C_3H_6O$ and 15 wt.-% $C_2H_4O$. |
| Polymer/Polyol II | A polymer/polyol with an OH No. of about 32 which is produced by polymerizing 50 weight percent acrylonitrile in 50 weight percent Polyol B. The polymer in the polymer/polyol has a molecular weight of about 3500. |
| PFAR | The reaction product of phenol, formaldehyde and aniline as described below |

-continued

| Abbreviation | Meaning |
|---|---|
| Aromatic Diol I | $N(CH_2CH_2OH)_2$ 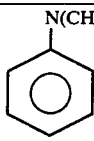 EW ~90 The reaction product of aniline and ethylene oxide. |
| Aromatic Diamine I | A reaction product of aniline, 2-chloroaniline and formaldehyde. The reaction product is a mixture of aniline, 2-chloro-aniline, 4,4'-methylene dianiline (MDA), 3-chloro-4,4'-diaminodiphenylenethane and 4,4'-methylene bis(2-chloroaniline) (MOCA). The reaction product has EW-126. |
| DABCO 33LV | 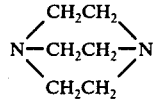 |
| T-12 | dibutyltin dilaurate |
| Isocyanate A | An isocyanate blend containing 65 weight percent 2,4-tolylene diisocyanate and 35 weight percent 2,6-tolylene diisocyanate. |
| Isocyanate B | The reaction product of 80/20 2,6-tolylene diisocyanate and tripropylene glycol. The FNCO of this quasi prepolymer is about 30 percent. |
| Surfactant I* | A mixture comprising: (a) 20 wt.% of a siloxane block copolymer having the structural formula: $$Me_3Si(Me_2SiO)_{\overline{3.8}}\text{---}(MeSiO)_{\overline{2.8}}\text{---}OSiMe_3$$ $$\qquad\qquad\qquad\qquad\;\;|$$ $$\qquad\qquad\qquad CH_2CH_2CH_2(OC_2H_4)_3OMe$$ (b) 10 wt.% of a siloxane block copolymer having the structural formula: $$Me_3Si(MeSiO)_{\overline{2.5}}\text{---}(MeSiO)_{\overline{1.5}}\text{---}OSiMe_3$$ $$\qquad\qquad\qquad\;|$$ $$\qquad\qquad CH_2CH_2CH_2CN$$ and, (c) 70 wt.% of a polyalkylene oxide triol produced from propylene oxide and glycerine and having a molecular weight of about 3000 and an OH No. of about 56. ("Me" = methyl). |
| Surfactant II* | A mixture comprising: (a) 15% of a siloxane block co-polymer having the structural formula: $$Me_3Si(Me_2SiO)_{\overline{3.8}}\text{---}(MeSiO)_{\overline{2.8}}\text{---}OSiMe_3$$ $$\qquad\qquad\qquad\qquad\;|$$ $$\qquad\qquad\qquad CH_2CH_2CH_2(OC_2H_4)_3OMe$$ and, (b) 85 wt.% Polyol A. (Me = methyl). |

*Not critical; used to produce a more uniform cell structure in the urethane elastomer.

"Stream Weight Ratios" (R/A) referred to below are calculated as follows:

Three values are required for calculation of the stream weight ratio of polyol to isocyanate: the free isocyanate content of the isocyanate and the hydroxyl number and moisture content of the polyol. They can be determined by standard analytical methods. Sample Calculations follow:

Given

Isocyanate Stream FNCO = 26.0%

Polyol Stream OH No. = 142

Polyol Stream $H_2O$ Content = 0.090%

Moisture reacts with the isocyanate and is not accounted for by the OH No. of the polyol. The OH No.

must be corrected by adding the OH No. equivalent of the water to the OH No.

$0.090 \times 62.3 = 5.6$ $142 \times 5.6 = 148$ (corrected OH No.)

The equivalent weight (EW) of the polyol and of the isocyanate are then calculated. Percent FNCO is based upon EW 42 (NCO) and OH No. is based upon EW 56.1 (KOH).

EW Isocyanate = $(4.2 \times 1000)/26 = 162$
EW Polyol = $(56.1 \times 1000)/148 = 380$ Since one equivalent of isocyanate plus one equivalent of polyol are required to make a urethane polymer of FNCO/OH equivalent ratio of 1.00 (or 100 index) then weight ratio of polyol to isocyanate = $380/162 = 2.34$.

If an index other than 100 is desired the formula is $Ri = (R \times 100)/\text{Index}$ Where $R$ = the weight ratio for 100 index and $R_i$ = the weight ratio for any index other than 100

For example, the calculation for a 103 index is: $R_i = (2.34/103) \times 100 = 2.27$, where $i = 103$ or 2.27 parts of the polyol should be reacted with 1.00 parts of the isocyanate to provide a urethane polymer of 103 isocyanate index.

The following foaming characteristics and foam properties were observed or measured with regard to various cellular polyurethane elastomers produced as described below.

Cream Time

The interval of time from the formation of the complete formulation to the appearance of a creamy color in the formulation. The cream time is proportional to the rate of reaction of the formulation.

Rise Time

The interval of time from the formation of the complete formulation to the attainment of the maximum height of the cellular elastomer.

Tack Free Time

The interval of time from the formation of the complete formulation to the disappearance of the tacky feel from the surface of the resulting elastomer.

For the sake of brevity, the cellular polyurethane elastomers described below are sometimes referred to simply as "urethanes".

Preparation and Properties of Phenol-Formaldehyde-Aniline Resin (PFAR)

A reactor is charged with a 50:50 wt. percent mixture of phenol and aniline at 50° C and 15 psig nitrogen. The reactor is heated to 90° C. Formaldehyde is fed into the reactor in an amount of about 10 wt. percent of the phenolaldehyde mixture, while the reactor temperature is maintained at 90° C. After the formaldehyde has been fed into the reactor, the pressure is reduced to zero psig and the mixture is heated to 180° C and held at that temperature for 1 hour, during which time a distillate of water of condensation is removed. The mixture is then maintained at 180° C and 15 mm Hg for 6 hours, during which time a distillate of unreacted phenol and aniline is removed. The yield of PFAR product in the reactor is about 52 wt % of the initial reaction mixture.

Typically, PFAR has a viscosity of 3,000–13,000 centistokes at 210° F, a viscosity of 16–25 centistokes at 180° C, a melting point of 60°–80° C, and a density of 1.10–1.15 grams/cubic centimeter at 180° C.

CRITERIA

Present day performance criteria for elastomers as force-reducing impact media are somewhat limited. Therefore, functional goals were set up for the experiments described below which, it was felt, if met would produce a material of satisfactory performance. These are given below:

a. The capability to absorb energy of the level encountered in low speed (<10 mph) vehicle collisions over the service temperature in a minimal distance.

b. The capability of being easily processed with available relatively low cost equipment.

c. Shelf stable chemical intermediates suitable for commercial operation, notably non-toxic, available and of relatively low cost.

These requirements seem best answered by the use of an urethane foam for the force-reducing impact media. A urethane foam is the product resulting from the in-process density reduction of a solid urethane elastomer. Solid urethanes inherently possess many performance advantages over natural and synthetic rubbers, e. g., strength properties over a wide temperature range, abrasion and solvent resistance. The reduction in density, or foaming is done for a variety of reasons, not least among them is cost reduction when the properties of the expanded product can meet established performance criteria. Other advantages over liquid-cast solid elastomers are (a) moldability (internal pressure causes excellent mold fill-out and simplicity of process), and (b) these materials are inherently flexible for engineering property variation through formulation. Microcellular urethane material and process are described in depth in Reference 2.

Processing and Testing

The following preparation of a urethane foam, Compound B, is typical of the preparations of all the urethanes of this invention. The Resin Activator components (blends) were formulated for processing on a Martin Sweets urethane metering-mixture machine (40–50 lb/min max thruput). The wt. parts of ingredients used are shown below.

| Resin | Wt. parts | Activator | Wt. parts |
|---|---|---|---|
| Polymer/Polyol I | 80 | Isocyanate A | 19.7 |
| Aromatic Diol I | 10 | Trichloro-fluoromethane | 6.7 |
| PFAR | 10 | | |
| DABCO 33LV | 0.1 | | |
| Surfactant I | 1.0 | | |

The above wt. parts of Resin materials are combined in a 55 gallon drum. The aromatic Diol I/PFAR curative is heated for 2½ – 3 hours at 130° C in a 5 gal pail with occasional hand-stirring. The PFAR solid melts in the mixture at 100°–110° C. The temperature of the melted mixture is dropped to 100° C, and the mixture is then added to another 55 gallon drum and mixed under nitrogen for an hour with a mounted Lightning Mixer at 2300 rpms. The inital temperature of the Polymer Polyol I was 25° C. The DABCO 33LV and Surfactant I were blended at ambient temperature (75° F) prior to mixing. The above weights of Activator were mixed separately under nitrogen for 30 minutes at ambient temperature (75° F). The prepared Resin and Activator components were charged into their respective pots on the Martin Sweets and circulated. Samples were taken from the machine for chemical analyses (FNCO, H$_2$O, OH No.) to be used for calculation of stream weight ratio. The ratio was calculated upon receipt of the chemical analysis. The metering pumps on the Martin Sweets were adjusted to deliver the desired ratio and thruput to the mixing head. The components were delivered to the heated (170° F) 24 × 6 × 5 inch closable steel mold for making the part. Ten minutes was allowed for ambient cure before the part was removed from the mold, and the samples were allowed to ambient post cure for a week prior to physical testing by standard ASTM rubber test methods.

The formulations investigated are given in Tables 1 and 8. The curatives examined were PFAR/propylene glycol (Compound C), PFAR/Aromatic Diol I (Compounds B and F), Aromatic Diamine I (Compound D), Aromatic Diamine I/Aromatic Diol I (Compounds A and E), and Aromatic Diamine I/Propylene glycol. PFAR as a sole urethane curative was not examined because the resulting resin viscosity is too high for satisfactory processing.

Physical properties were measured on samples of Compounds A and B using standard ASTM rubber tests. The test results are given in Tables 4 & 6 below. The ASTM test methods used for each measurement are given in Table 5 below.

Pendulum to moveable vehicle impact tests were made on Compounds A and B at three temperatures, −20° F, 75° F, and 120° F. The test samples were conditioned in temperature boxes for at least 12 hours prior to the dynamic test, mounted on the vehicle at ambient temperature and immediately impacted 5.5 mph. The vehicle weight and the pendulum weight were 3500 lbs. each. Forces and deflection were measured concurrently and read out as force deflection plots. The parameters, Max Force, Max Deflection, Stored Absorbed Energy, Hysteresis Energy, Vehicle Compliance Coefficient and Cycle Efficiency were taken from and/or calculated from the individual dynamic load deflection data. These data are shown in Table 7.

To obtain further information on the dynamic impact properties of urethanes using curatives of the invention, pendulum to rigid fixture impact tests were made on Compounds C,D,E,F and G. Impact test blocks of urethane were cut from the samples and impacted at 5 mph at ambient temperature with a 2365 lb. flat headed pendulum. The impact data are shown in Table 9 below for the designated test samples. Each of the evaluation parameters were explored which were previously mentioned. An explanation of the various impact evaluation parameters appears below:

In any effective automotive bumper system design two components are allowed to deflect under impact and, hence absorb energy. The primary functional component of the system is the energy absorbing member, whether it be an elastomeric material or a mechanical device. The energy absorbed by this component Ea is the integrated area under the loading portion of the force (F) versus deflection (X) curve:

$$Ea = \int_0^{X_m} F dX \quad (1)$$

where $X_m$ corresponds to the maximum deflection experienced by the energy absorber. From this relationship it is noted that for a given amount of absorbed energy, an object which decelerates through a short distance produces a greater force level than an object which decelerates less rapidly through a longer distance.

The energy returned by the functional component after it receives its maximum deflection corresponds to the area under the unloading portion of the force versus deflection curve. For elastomeric materials, this returned energy is always less than the absorbed energy. The difference, which is termed hysteresis energy $E_h$, reflects that portion of the absorbed energy which is converted to molecular energy losses within the material.

The frame rails and support members of the vehicle chassis also provide energy absorption during impact. If it is assumed that all of these many structural deflections are linear with respect to force, then the chassis may be approximated as a perfectly elastic spring with an overall force constant, K. The total energy absorbed by the vehicle structure, Estr, may be represented by the following:

$$Estr = \int_0^{X_m} F\, dX = \int_0^{X_m} KX dX = \frac{1}{2} KX_m^2 = \frac{F_m^2}{2K} = CF_m^2$$

where $C = 1/2K$ corresponds to a compliance factor for the structure. (3) It is seen that the total energy stored by the elastic nature of the vehicle structure is proportional to the square of the maximum force, $F_m$.

Max Force — read directly from the dynamic force deflection curve (lbs.)

Max Deflection — read directly from the dynamic force deflection curve (inches).

Absorbed Energy — total area under "in cycle" on dynamic force deflection curve (ft. lbs.).

Hysteresis Energy — difference between total area under "in cycle" and "out cycle" curve on dynamic force deflection curve (ft. lbs.).

Cycle Efficiency Fraction — calculated from the equation:

$$E = X_T/X$$

where $$X_T = V^2 \times W \times 0.183 \times E_f/F$$

when $X_T =$ theoretical deflection (inches)
$X =$ actual measured deflection (inches)
$V =$ velocity of impact (ft./sec.)
$W =$ weight vehicle (lbs.)
$E_f =$ fraction absorbed energy of total energy $F =$ max force (lbs.)

An ideal impact media provides minimum max deflection at impact velocity for a given force. Thus, one can define efficiency for the cycle according to the deflection obtained for a given force level. A constant force square wave deflection would in this case be classified as 100% efficiency.

The total energy picture for the pendulum to moveable vehicle model may be expressed according to the following equation:

| $E_T$ | $E_p$ | $+ E_A$ | $+ Estr$ | $+ E_c$ |
|---|---|---|---|---|
| (100%) = | (30%) | (30–35%) | (5–10%) | (30%) | where $E_p$ = the remaining KE in the pendulum after an in-line impact $E_A$ = absorbed energy in the urethane $E_{str}$ = absorbed energy in the vehicle assuming it acts as a spring $E_c$ = energy lost to the vehicle to provide movement; this is assumed to be about a perfect elastic collision The urethane bumper and the vehicle itself may be considered in combination on impact as a temperature sensitive spring (the urethane) in series with a constant (over temperature) spring (the vehicle). If the urethane becomes hard at cold temperatures and does not deflect and absorbs much energy this energy is transmitted to the vehicle frame which is of course not desirable. Both springs have a common force but different deflections depending upon the spring constant of each. The vehicle can take so much energy without destructing, so it is important to design relatively temperature-insensitive urethane compounds for automotive bumpers.

In Tables 1 and 2 formulation, process conditions and reactivity are given for Comparison Compound A (Table 1) and Compound B (Table 2). The curatives employed in Comparison Compound A were Aromatic Diamine I/Aromatic Diol I, whereas those employed in Compound B were PFAR/Aromatic Diol I. By comparing Comparison Compound A with Compound B it is apparent that both formulations show suitable reactivity for comparable process conditions and resin formulations. Although the cream time for Compound B is less than that for Comparison Compound A (10. sec. versus 12 sec.), Compound B provides greater rise and tack-free times than those provided by Comparison Compound A. However, both formulations are considered to provide reasonable reactivities.

Table 3 presents a comparison of the viscosity of a 50/50 wt.% mixture of PFAR/Aromatic Diol I with a 50/50 wt.% mixture of PFAR/propylene glycol at temperatures of 100°, 130°, and 210° F. It is apparent that at an operating temperature of about 210° F, PFAR/propylene glycol provides a considerably less viscous curative than does PFAR/Aromatic Diol I (17 cstks versus 100 cstks, respectively). The low resin viscosity obtained using the PFAR/propylene glycol curative relative to PFAR/Aromatic Diol I gives PFAR/propylene glycol the advantage of allowing formulation processing on urethane-metering mixing machines.

Core physical properties for Comparison Compound A and Compound B were measured on samples of each formulated product by standard ASTM rubber tests as given in Table 4. The ASTM test methods used for each measurement are shown in Table 5 below.

Values for the 25% Compression Modulus and Compression Modulus Ratio are given in Table 6 for Comparison Compound A and Compound B. Both curatives provide urethanes which display excellent temperature insensitivity as shown by the Compression Modulus values. Further, it is noted that the values for the 25% Compression Modulus Ratio (which is a measure of temperature insensitivity between the temperature extremes of −40° F and 125° F) is the same for both urethanes (2.7).

In Table 7 the results of the pendulum to vehicle impact evaluation are given for Compounds A and B. The energy absorbed by Compound B at −20° F(755 ft lbs) exceeded the absorbed energy of Comparison Compound A(508 ft lbs) despite the low core density of Compound B(11.6 pcf versus 12.6 pcf for Compound A, see Table 4). These results demonstrate the excellent energy-managing ability of Compound B at low temperature (−20° F). In contrast, at a temperature of 120° F Compound A provides a higher Absorbed Energy value than does Compound B (899 ft lbs versus 785 ft lbs, respectively).

Pendulum to rigid fixture impact tests were made on urethane compounds C,D,E,F and G. The formulation for each of these urethanes is given in Table 8. The results of the impact tests are presented in Table 9. Table 9 presents both the Static Compression Modulus (SCM), a measure of the compression modulus at low impact levels as determined using an Instron tester and the Dynamic Compression Modulus (DCM), a measure of the compression modulus at impact of the pendulum to the fixture holding the urethane. The ratio of DCM/SCM is a measure of the strain-rate sensitivity of the urethane. The values for DCM/SCM ratio as given in Table 9 show the compounds containing the curatives of the invention (Compounds C and F) to have excellent strain-rate sensitivity relative to the comparison compounds (Compounds D,E and G). For example, Compound F (containing PFAR/Aromatic Diol I curative) has a DCM/SCM ratio of 3.25 which is higher than all comparison compounds, including Compound E (DCM/SCM = 3.13). Also, the DCM/SCM Ratio of Compound C (2.86) is greater than all comparison formulations except Compound E (3.13). Thus, the curatives of the invention provide urethanes which show excellent strain-rate sensitivity using the pendulum to rigid fixture impact tests.

TABLE 1

Formulation, Process Conditions and Reactivity for Compound A Microcellular Urethane

| Formulation | | | |
|---|---|---|---|
| pph | Resin | pph | Activator |
| 80 | Polymer Polyol I | 19.9 | Isocyanate A |
| 10 | Aromatic Diol I | 5.5 | Trichlorofluoromethane |
| 10 | Aromatic Diamine I | | % FNCO = 36.9 in activator |
| 0.4 | DABCO 33LV | | |
| 1.0 | Surfactant I | | |

OH No. = 118
% H$_2$O = 0.05

| Process Conditions | |
|---|---|
| Resin Temperature, ° F | 104 |
| Activator Temperature, ° F | 60 |
| Stream Weight Ratio, R/A | 3.9 |
| Isocyanate Index | 105 |
| Mold Temperature, ° F | 120 |
| Thruput, lb/min | 40 |

| Reactivity | |
|---|---|
| Cream Time, sec. | 12 |
| Rise Time, sec. | 58 |
| Tack-Free Time, sec. | 77 |

TABLE 2

Formulation Process Conditions and Reactivity for Compound B Microcellular Urethane

| Formulation | | | |
|---|---|---|---|
| pph | Resin | pph | Activator |
| 80 | Polymer Polyol I | 27.6 | Isocyanate A |
| 10 | Aromatic Diol I | 9.3 | Trichlorofluoromethane |
| 10 | PFAR | | |
| 0.1 | DABCO 33LV | | % FNCO = 37.3 in activator |
| 1.0 | Surfactant I | | |

OH No. = 123
% H$_2$O = 0.04

TABLE 2-continued

| Process Conditions | |
|---|---|
| Resin Temperature, °F | 125 |
| Activator Temperature, °F | 60 |
| Stream Weight Ratio, R/A | 3.81 |
| Isocyanate Index | 105 |
| Mold Temperature, °F | 120 |
| Thruput, lb/min | 40 |

| Reactivity | |
|---|---|
| Cream Time, sec. | 10 |
| Rise Time, sec. | 90 |
| Tack-Free Time, sec. | 100 |

TABLE 3
Viscosity vs. Temperature for Curatives A and B

| | Viscosity (cstks.) | |
|---|---|---|
| Temperature, °F | PFAR/Aromatic Diol I[1] | PFAR/Propylene glycol[2] |
| 100 | 130,000 | 570 |
| 130 | 8,000 | 150 |
| 210 | 100 | 17 |

[1] 50/50 wt. % PFAR/Aromatic Diol I
[2] 50/50 wt. % PFAR/Propylene glycol

TABLE 4
Core Physical Properties of Microcellular Urethane Compounds

| Compound | A | B |
|---|---|---|
| Core Density, pcf | 12.6 | 11.6 |
| Hardness, Shore A at | | |
| −20° F | 44 | 49 |
| 75° F | 30 | 31 |
| 125° F | 26 | 32 |
| 100% Modulus, psi | — | — |
| Tensile Strength, psi | 206 | 152 |
| Ultimate Elongation, % | 87 | 67 |
| C Tear pli | 24 | 20 |
| B Compression Set, % | 37 | 77 |
| 50% Compression Modulus, psi | 64 | 52 |
| Bashore Resilience, % at | | |
| −20° F | 21 | 21 |
| 75° F | 34 | 33 |
| 125° F | 43 | 38 |

TABLE 5
Physical Test Methods

| Property | ASTM Method | Specimen Size* |
|---|---|---|
| Density | D1564 | 1"×1"×½" thick |
| Hardness | D2240 | 1"×1"×½" thick |
| Tensile Strength | D412 | ⅛"–¼" thick |
| Tear | D624C | ⅛"–¼" thick |
| Compression Set | D395B 22 hr at 158° F 50% compressed | 1"×1"×½" thick |
| Compression Modulus | D575 | 1"×1"×½" thick |
| Bashore Resilience | D2632 | 1"×1"×½" thick |

*" denotes inch

TABLE 6
Effect of Temperature on 25% Compression Modulus of Microcellular Urethane Elastomers

| | 25% Compression Modulus, psi | |
|---|---|---|
| Temperature °F | Compound A | Compound B |
| −40° F | 71 | 81 |
| −20° F | 64 | 74 |
| −0° F | 58 | 55 |
| 72° F | 31 | 37 |
| 100° F | 27 | 36 |
| 125° F | 26 | 30 |
| 25% Compression Modulus, Ratio | | |
| −40/125° F | 2.7 | 2.7 |

TABLE 7
Pendulum to Vehicle Impact Evaluation of Microcellular Urethanes

| Compound | A | B |
|---|---|---|
| Max Force, lbs at | | |
| −20° F | 13,700 | 14,800 |
| 75° F | 14,100 | 13,300 |
| 120° F | 13,500 | 15,800 |
| Max Deflection, inches at | | |
| −20° F | 0.78 | 1.04 |
| 75° F | 2.08 | 2.10 |
| 120° F | 2.27 | 2.38 |
| Absorbed Energy, ft lbs at | | |
| −20° F | 508 | 755 |
| 75° F | 1045 | 1010 |
| 120° F | 899 | 785 |
| Absorbed Energy, % of Input Energy at | | |
| −20° F | 14 | 21 |
| 75° F | 30 | 29 |
| 120° F | 25 | 23 |
| Hysteresis Energy, ft lbs at | | |
| −20° F | 438 | 622 |
| 75° F | 666 | 630 |
| 120° F | 591 | 475 |
| Hysteresis Energy, % of Input Energy at | | |
| −20° F | 12 | 18 |
| 75° F | 19 | 18 |
| 120° F | 17 | 14 |
| Cycle Efficiency, % | | |
| −20° F | 57 | 59 |
| 75° F | 43 | 43 |
| 120° F | 35 | 25 |

TABLE 8
Formulation for Compounds C,D,E,F and G Microcellular Urethanes

| Compound | C | D | E | F | G |
|---|---|---|---|---|---|
| Polymer/Polyol I, pph | 43 | 43 | 43 | 43 | 43 |
| Polymer/Polyol II, pph | 43 | 43 | 43 | 43 | 43 |
| PFAR, pph | 7 | | | 7 | |
| Aromatic Diamine I, pph | | 14 | 7 | | 7 |
| Aromatic Diol I, pph | | | 7 | 7 | |
| Propylene glycol, pph | 7 | | | | 7 |
| H₂O, pph | 1.5 | 1.5 | 1.5 | 1.5 | 1.5 |
| Dabco 33LV, pph | 0.5 | 0.5 | 0.5 | 0.5 | 0.5 |
| T-12, pph | 0.02 | 0.02 | 0.02 | 0.02 | 0.02 |
| Surfactant II, pph | 1.0 | 1.0 | 1.0 | 1.0 | 1.0 |
| Isocyanate B, pph | 69.2 | 47.0 | 47.2 | 51.8 | 66.0 |

TABLE 9
Pendulum to Rigid Fixture Impact Data for Compounds C,D,E,F and G Microcellular Urethanes

| Compound Curative | C /1/ | D* /2/ | E* /3/ | F /4/ | G* /5/ |
|---|---|---|---|---|---|
| Hardness Shore A | | | | | |
| −20° F | 46 | 41 | 43 | 42 | 48 |
| 75° F | 28 | 28 | 23 | 22 | 30 |
| 125° F | 30 | 28 | 21 | 22 | 31 |
| 100% Modulus, psi | 113 | 121 | 99 | 91 | 125 |
| Tensile strength, psi | 125 | 126 | 128 | 113 | 151 |
| Ultimate Elongation | 122 | 102 | 143 | 123 | 130 |
| Tear, pli | 24 | 28 | 25 | 21 | 31 |
| Bashore Resilience | | | | | |
| −20° F | 19 | 22 | 18 | 18 | 22 |
| 75° F | 21 | 23 | 19 | 19 | 19 |
| 125° F | 21 | 28 | 22 | 23 | 23 |
| Compression Set, % | 100 | 92 | 88 | 93 | 95 |
| 25% Static Compression Modulus (SCM), psi | 22 | 22 | 15 | 16 | 24 |
| Core Density, pcf | 7.6 | 7.3 | 7.4 | 7.4 | 7.3 |
| 25% Dynamic Compression Modulus (DCM), psi | 63 | 56 | 47 | 52 | 64 |
| DCM/SCM Ratio | 2.86 | 2.54 | 3.13 | 3.25 | 2.67 |

*Comparison Compounds
/1/ PFAR/Propylene glycol
/2/ Aromatic Diamine I
/3/ Aromatic Diamine I/Aromatic Diol I
/4/ PFAR/Aromatic Diol I
/5/ Aromatic Diamine I/Propylene glycol

What is claimed is:

1. A process for producing a cellular polyurethane elastomer which comprises forming and curing a reaction mixture containing:
   (a) a polyol,
   (b) as a curative, the reaction product of:
      (I) a phenol which has at least one unsubstituted reactive position on the aromatic nucleus,
      (II) an aldehyde, and
      (III) an aromatic amine,
   (c) as a curative, an organic diol,
   (d) an organic polyisocyanate in an amount that provides from 0.8 to 1.3 isocyanato groups per active-hydrogen group in the reaction mixture,
   (e) a catalytic amount of catalyst for the curing of the reaction mixture to produce the elastomer, and
   (f) a blowing agent in an amount sufficient to produce a cellular structure in the elastomer,
said reaction mixture containing from 99 to 30 parts by weight of (a) and from 1 to 70 parts by weight of (b) per 100 parts by weight of (a) and (b) and said reaction mixture containing from 1 to 35 parts by weight of (c) per 100 parts by weight of (a) and (c), with the proviso that the reaction mixture contains no more than 35 parts by weight of (b) and (c) per 100 parts by weight of (a), (b) and (c).

2. An elastomer produced by the process of claim 1.

3. A process as claimed in claim 1 wherein component (b) is the reaction product of
   (I) phenol
   (II) formaldehyde, and
   (III) aniline,
wherein the molar ratio of (I) to III ranges from about 6:1 to about 1:6 and wherein the molar ratio of (I) + (III) to (II) ranges from about 6:1 to about 1.2:1.

4. A process as defined in claim 3 wherein the diol is an alkylene diol.

5. A process as defined in claim 4 wherein the alkylene diol is propylene glycol.

6. An elastomer produced by the process of claim 5.

7. A process as claimed in claim 3 wherein the diol is an aromatic diol.

8. A process as claimed in claim 7 wherein the aromatic diol is the reaction product of aniline and ethylene oxide.

9. An elastomer produced by the process of claim 8.

* * * * *